United States Patent Office 3,379,653
Patented Apr. 23, 1968

3,379,653
COLD-CURABLE MIXTURES OF CYCLOALI-
PHATIC POLYEPOXIDES AND CURING
AGENTS
Otto Ernst, Pfeffingen, Basel, and Hans Lehmann, Basel,
Switzerland, assignors to Ciba Limited, Basel, Switzer-
land, a company of Switzerland
No Drawing. Filed Oct. 6, 1964, Ser. No. 402,012
Claims priority, application Switzerland, Oct. 18, 1963,
12,793/63
10 Claims. (Cl. 260—2)

ABSTRACT OF THE DISCLOSURE

Cold-curing compositions comprising (a) a cycloaliphatic polyepoxy compound containing at least one 1,2-epoxide attached to a carbocyclic ring with at least 5 and at the most 6 members,
(b) a metal fluoborate, and
(c) a complex of boron trifluoride with a member selected from the group consisting of water, ammonia and organic compounds capable of forming a complex with boron trifluoride. The curable mixtures may be used as laminating resins, paints, lacquers, dipping resins, casting resins, coating compositions, pore fibers, putties, adhesives, moulding compositions, plastic foams, insulating compounds for the electrical industry and for manufacture of such products.

It is known that cycloaliphatic polyepoxy compounds can be hot-cured with the aid of polycarboxylic acid anhydrides to form infusible and insoluble resins having good mechanical properties and particularly high heat distortion points. Cold-curing of cycloaliphatic polyepoxides, on the other hand, has hitherto been difficult. When one of the usual cold curing agents for epoxy resins is used, for example ethylenediamine, diethylenetriamine or triethylenetetramine, cycloaliphatic polyepoxides do not as a rule yield cured products having useful technical properties. Accordingly, it has already been proposed to cold-cure cycloaliphatic polyepoxy esters, for example 6-methyl-3,4-epoxycyclohexyl-carboxylic acid(6-methyl-3,4-epoxycyclohexyl)methylester with a combined curing system consisting of maleic anhydride and a boron trifluoride-amine complex. However, this curing reaction is very exothermic and consequently difficult to control so that strong local overheating and charring of cured mouldings and castings are observed when large batches are manufactured. It is another disadvantage of these known resin curing agent systems that the two ingredients of the curing system must be marketed separately since a mixture of maleic anhydride and the boron trifluoride-amine complex is not storable. Therefore, the resin curing agent system must be offered to the consumer in the form of a three-component system.

It has now been found that the disadvantages mentioned above can be prevented by using for the cold-curing of cycloaliphatic polyepoxides a metal fluoborate in conjunction with a complex of boron trifluoride with water, ammonia or an organic compound capable of forming complexes with boron trifluoride. The exothermic heat released during the curing reaction is of a lesser order than that released in the known cold-curing with maleic anhydride and boron trifluoride-amine complexes so that the curing reaction is easy to control and even with large batches light-colored castings and mouldings are obtained; the latter have in addition better mechanical properties and higher heat distortion points than the products obtained by the known cold-curing of cycloaliphatic polyepoxy esters. Furthermore, the metal fluoborates are readily compatible with the boron trifluoride complexes so that the curing component can be offered in the market as a storable mixture. Thus the resin curing agent system can be offered to the consumer as a two-component system, which constitutes a considerable simplification compared with the known three-component systems.

Accordingly, the present invention provides cold-curing mixtures suitable for the production of coatings, castings, mouldings, adhesives and as interlayer material for laminates, characterized in that the said mixtures contain (a) a cycloaliphatic polyepoxy compound containing at least one 1,2-epoxy group in a five-membered or six-membered ring,
(b) a metal fluoborate and
(c) a complex of boron trifluoride and water, ammonia or an organic compound capable of forming complexes with boron trifluoride, preferably a boron trifluoride-amine complex.

As cycloaliphatic polyepoxy compounds containing at least one six-membered ring carrying a 1,2-epoxide group, there may be mentioned:

limonenedioxide,
vinylcyclohexenedioxide,
cyclohexadienedioxide,
bis(3,4-epoxycyclohexyl)dimethylmethane;
epoxycyclohexylmethyl ethers of glycols or hydroxyalkyl-
 eneglycols such as
diethyleneglycol-bis(3,4-epoxy-6-methylcyclohexyl-
 mehtyl)ether;
ethyleneglycol-bis(3,4-epoxycyclohexylmethyl)ether,
1,4-butanediol-bis(3',4'-epoxycyclohexylmethyl)ether,
(3,4-epoxycyclohexylmethyl)-glycidylether;
(3,4-epoxycyclohexyl)-glycidyl ether,
ethyleneglycol-bis(3,4-epoxycyclohexyl-ether,
1,4-butanediol-bis(3',4'-epoxycyclohexyl)ether,
p-hydroxyphenyldimethylmethane-bis(3,4-epoxycyclo-
 hexyl)ether;
bis(3,4-epoxycyclohexyl)ether;
(3',4'-epoxycyclohexylmethyl)-3,4-epoxycyclohexyl-
 ether;
3,4-epoxycyclohexane-1,1-dimethanol-diglycidylether.
epoxycyclohexane-1,2-dicarboximide, such as
N,N'-ethylenediamine-bis(4,5-epoxycyclohexane-1,2-di-
 carboximide);
epoxycyclohexylmethyl-carbamates, such as
bis(3,4-epoxycyclohexylmethyl)-1,3-toluylene-dicarba-
 mate;
epoxycyclohexane-carboxylates of aliphatic polyols such as
3-methyl-1,5-pentanediol-bis(3,4-epoxycyclohexane-
 carboxylate),
1,5-pentanediol-bis(3,4-epoxycyclohexane-carboxylate),
ethyleneglycol-bis(3,4-epoxycyclohexane-carboxylate),
2,2-diethyl-1,3-propanediol-bis(3,4-epoxy-cyclohexane-
 carboxylate),
1,6-hexanediol-bis(3,4-epoxycyclohexane-carboxylate),
2-butene-1,4-diol-bis(3,4-epoxycyclohexane-carboxylate),
2-butene-1,4-diol-bis(3,4-epoxy-6-methylcyclohexane-
 carboxylate),
1,1,1-trimethylolpropane-tris-(3,4-epoxy-cyclohexane-
 carboxylate),
1,2,3-propanetriol-tris(3',4'-epoxy-cyclohexane-
 carboxylate);
epoxycyclohexanecarboxylates of hydroxyalkylene glycols
such as
diethylene-glycol-bis(3,4-epoxy-6-methylcyclohexane-
 carboxylate),
triethyleneglycol-bis-(3,4-epoxycyclohexanecarboxylate);
epoxycyclohexylalkyldicarboxylic acid esters such as bis(3,4-epoxycyclohexylmethyl)maleate,
bis(3,4-epoxycyclohexylmethyl)oxalate,
bis(3,4-epoxy-cyclohexylmethyl)-pimelate,
bis(3,4-epoxy-6-methylcyclohexylmethyl)succinate,
bis(3,4-epoxy-6-methylcyclohexylmethyl)adipate
bis(3,4-epoxy-6-methylcyclohexylmethyl)sebacate,
bis(3,4-epoxycyclohexylmethyl)terephthalate,
bis(3,4-epoxy-6-methylcyclohexylmethyl)terephthalate;
further, especially 3,4-epoxycyclohexanecarboxylates of 3,4-epoxycyclohexylmethanols, such as (3',4'-epoxy-cyclohexylmethyl) 3,4-epoxycyclohexanecarboxylate,
(3',4'-epoxy-6'-methylcyclohexylmethyl)3,4-epoxy-6-methyl-cyclohexanecarboxylate,
(3',4'-epoxy-2'-methyl-cyclohexylmehtyl) 3,4-epoxy-2-methylcyclohexanecarboxylate,
(1'-chloro-3',4'-epoxycyclohexyl)-1-chloro-3,4-epoxy-cyclohexane-carboxylate,
(1'-bromo-3',4'-epoxycyclohexylmethyl)-1-bromo-3,4-epoxycyclohexanecarboxylate;

epoxycyclohexyl-carboxylic acid esters such as bis(3,4-epoycyclohexyl(adipate,
and -succinate,
bis(3,4-epoxycyclohexyl)carbonate,
(3,4-epoxycyclohexyl)-3,4-epoxycyclohexanecarboxylate,
3,4-epoxycyclohexylmethyl-9,10-epoxystearate;
2',2''-sulfonyldiethanol-bis-(3,4-epoxycyclohexanecarboxylate);
bis(3,4-epoxycyclohexylmethyl)carbonate,
bis(3,4-epoxy-6-methylcyclohexylmethyl)carbonate;
3,4-epoxy-6-methyl-cyclohexanecarboxaldehyde-bis(3,4-epoxy-6-methylcyclohexylmethyl)acetal;
bis(3,4-epoxycyclohexylmethyl)formal,
bis(3,4-epoxy-6-methyl-cyclohexylmethyl)formal;
benzaldehyde-bis(3,4-epoxycyclohexylmethyl)acetal;
acetaldehyde-bis(3,4-epoxycyclohexylmethyl)acetal,
acetone-bis(3,4-epoxycyclohexylmethyl)ketal,
glyoxal-tetrakis(3,4-epoxycyclohexylmethyl)acetal;
3-(3',4'-epoxycyclohexyl)-9,10-epoxy-2,4-dioxaspiro-(5,5)-undecane;
3-(3',4'-epoxy-6-methylcyclohexyl)-9,10-epoxy-7-methyl-2,4-dioxaspiro(5,5)undecane;
bis(3,4-epoxyhexahydrobenzal-D-sorbitol;
bis(3,4-epoxyhexahydrobenzal)pentaerythritol
(3,9-bis-(3,4-epoxycyclohexyl)-spirobi(metadioxane)),
bis(3,4-epoxy-6-methyl-hexahydrobenzal)pentaerythritol;
3-(3',4'-epoxycyclohexylmethyl-oxyethyl)2,4-dioxaspiro-(5,5)-9,10-epoxyundecane,
3-(3',4'-epoxycyclohexylmethyloxy-(2')-propyl)-2,4-dioxaspiro(5,5)-9,10-epoxyundecane;
3,9-bis(3',4'-epoxycyclohexylmethylhydroxyethyl)spirobi-(m-dioxane);
3-(2',3'-epoxypropylhydroxyethyl)2,4-dioxaspiro(5,5)-9,10-epoxyundecane;
ethyleneglycol-bis-2'(2,4-dioxaspiro[5.5]-9,10-epoxyundecyl-3)-ethylether
polyethyleneglycol-bis-2'(2,4-dioxaspiro(5.5)-9,10-epoxyundecyl-3)ethylether,
1,4-butanediol-bis-2'(2,4-dioxaspiro(5.5)-8,10-epoxyundecyl-3)ethylether,
trans-quinitol-bis-2'(2,4-dioxaspiro(5.5)-9,10-epoxyundecyl-3)-ethylether,
bis(2,4-dioxaspiro(5.5)-9,10-epoxyundecyl-3)ether,
3,4-epoxyhexahydrobenzaldehyde(1'-glycidyloxyglycerol-2',3')-acetal.

As cycloaliphatic polyepoxy compounds containing at least one five-membered ring carrying a 1,2-epoxide group there may be mentioned:

dicyclopentadienediepoxide, glycidyl-2,3-epoxycyclopentylether,
bis(cyclopentenyl)ether-diepoxide,
2,3-epoxybutyl-2,3-epoxycyclopentylether,
epoxypentyl-2,3-epoxycyclopentylether,
9,10-epoxystearyl-2,3-cyclopentylether,
3,4-epoxycyclohexylmethyl-2,3-cyclopentylether,
2,2,5,5-tetramethyl-3,4-epoxycyclohexylmethyl-2,3-cyclopentylether,
2,2,5,5,6-pentamethyl-3,4-epoxycyclohexylmethyl-2,3-epoxycyclopentylether;
2,3-epoxycyclopenyl-9,10-epoxystearate;
2,3-epoxycyclopentyl-3,4-epoxycyclohexylcarboxylate,
2,3-epoxycyclopentyl-2,2,5,5-tetramethyl-3,4-epoxycyclohexylcarboxylate;
(3,4-epoxy-2,5-endomethylene-cyclohexylmethyl)-3,4-epoxy-2,5-endomethylene-cyclohexanecarboxylate,
bis(3,4-epoxy-2,5-endomethylene-cyclohexylmethyl) succinate;
bis(3,4-epoxy-2,5-endomethylene-cyclohexylmethyl) formal,
bis(3,4-epoxy-2,5-endomethylene-hexahydrobenzal) pentaerythritol,
3-(3',4'-epoxy-2',5'-endomethylenecyclohexylmethyl)-9,10-epoxy-2,4-dioxaspiro(5.5)-undecane;
bis(3-oxatricyclo[3.2.1.0$^{2,4}$]-oct-6-yl)carbonate,
bis(3-oxatricyclo[3.2.1.0$^{2,4}$]-oct-6-yl)-succinate,
(3-oxatricyclo[3.2.1.0$^{2,4}$]oct-6-yl)-3,4-epoxycyclohexylcarboxylate,
(3-oxatricyclo[3.2.1.0$^{2,4}$]oct-6-yl)-9,10-epoxyoctadecanoates;

further, especially epoxidized ethers and esters of dihydrodicyclopentadiene-8-ol, such as (4-oxatetracyclo[6.2.1.0$^{2,7}$0$^{3,5}$]hendec-9-yl)glycidylether,
(4-oxatetracyclo[6.2.1.0$^{2,7}$0$^{3,5}$]hendec-9-yl)-2,3-epoxybutylether,
(4-oxatetracyclo[6.2.1.0$^{2,7}$0$^{3,5}$]hendec-9-yl)-6-methyl-3,4-epoxy-cyclohexylmethylether,
(4-oxatetracyclo[6.2.1.0$^{2,7}$0$^{3,5}$]hendec-9-yl)-3,4-epoxycyclohexylether,
(4-oxatetracyclo[6.2.1.0$^{2,7}$0$^{3,5}$]hendec-9-yl)-3-oxatricyclo(3.2.1.0$^{2,4}$)-oct-6-yl-ether,
(4-oxatetracyclo[6.2.1.0$^{2,7}$0$^{3,5}$]hendec-9-yl)-3,4-epoxy-2,5-endomethylene-cyclohexylmethyl)ether;
ethyleneglycol-bis(4-oxatetracyclo[6.2.1.0$^{2,7}$0$^{3,5}$]hendec-9-yl)ether,
diethyleneglycol-bis(4-oxatetracyclo[6.2.1.0$^{2,7}$0$^{3,5}$]-hendec-9-yl-ether,
1,3-propyleneglycol-bis-(4-oxatetracyclo[6.2.1.0$^{2,7}$0$^{3,5}$]-hendec-9-yl)ether,
glycerol-bis(4-oxatetracyclo[6.2.1.0$^{2,7}$0$^{3,5}$]hendec-9-yl) ether;
bis(4-oxatetracyclo[6.2.1.0$^{2,7}$0$^{3,5}$]hendec-9-yl)formal;
bis(4-oxatetracyclo[6.2.1.0$^{2,7}$0$^{3,5}$]hendec-9-yl)succinate;
bis(4-oxatetracyclo[6.2.1.0$^{2,7}$0$^{3,5}$]hendec-9-yl)maleate;
bis(4-oxatetracyclo[6.2.1.0$^{2,7}$0$^{3,5}$]hendec-9-yl)phthalate;
bis(4-oxatetracyclo[6.2.1.0$^{2,7}$0$^{3,5}$]hendec-9-yl)adipate;
bis(4-oxatetracyclo[6.2.1.0$^{2,7}$0$^{3,5}$]hendec-9-yl)sebacate;
tris(4-oxatetracyclo[6.2.1.0$^{2,7}$0$^{3,5}$]hendec-9-yl)trimellitate,
9,10-epoxy-octadecanoic acid[4-oxatetracyclo-(6.2.1.0$^{2,7}$0$^{3,5}$)hendec-9-yl]ester
and
9,10,12,13-diepoxyoctadecanoic acid-(4-oxatetracyclo-[6.2.1.0$^{2,7}$0$^{3,5}$]hendec-9-yl)ester.

As metal fluoborates to be used as the first curing agent component according to the invention there may be mentioned the fluoborates of lithium, iron, cobalt, nickel, chromium, manganese, cadmium, mercury, beryllium, magnesium, calcium, strontium, barium, aluminium, vanadium antimony, tantalum, lanthanum, tin, lead and especially of copper and zinc.

Quite generally, the metal fluoborates should be soluble in the cycloaliphatic polyepoxy compound. They may be used in the anhydrous form or advantageously in the form of their hydrates, such as $Zn(BF_4)_2 \cdot 6H_2O$ or of their concentrated aqueous solutions. The metal fluoborates are advantageously used in an amount of 0.1 to 20%, preferably of 1 to 15%, by weight, referred to the weight of the cycloaliphatic polyepoxy compound.

As boron trifluoride complex to be used as the second curing agent component according to this invention there may be mentioned, for example:

Boron trifluoride hydrates such as $BF_3 \cdot H_2O$ and $$BF_3 \cdot 2H_2O$$

boron trifluoride-ammonia complex; complexes of boron trifluoride with ketones, diazonium salts, sulfides such as thiophene, 2-methylthiophene, carboxylic acids such as acetic acid; propionic acid, benzoic acid; carboxylic acid anhydrides such as acetic anhydride; carboxylic acid esters such as diethyloxalate; alcohols such as ethanol,
ethyleneglycol,
1,2-propyleneglycol,
1,3-butyleneglycol,
2,5-hexanediol,
2-ethyl-1,3-hexanediol,
2-methyl-2,4-pentanediol, ether alcohols such as diethylene-glycols,
triethyleneglycol,
ethyleneglycol monomethyl ether,
2,2′-dihydroxy-di-n-propyl ether;

ethers such as dimethyl ether,
diethyl ether,
methylethyl ether,
dibutyl ether,
diamyl ether,
isopropylbutyl ether,
methylamyl ether,
methylhexyl ether,
ethyleneglycol dimethyl ether,
phenylmethyl ether,
benzylethyl ether,
dibenzyl ether;

cyclic ethers such as furan,
tetrahydrofuran,
tetrahydrofurfuryl alcohol,
2-methyltetrahydrofuran,
2,5-dimethyltetrahydrofuran,
bis(tetrahydrofurfuryl)phthalate,
bis(tetrafurfuryl)-maleate,
bis(tetrahydrofurfuryl)formal,
dihydropyran,
tetrahydropyran;

phenols such as phenol,
resorcinol,
pyrocatechol,
bis(parahydroxyphenyl)dimethylmethane,
2,2-bis(para-hydroxyphenyl)butane;

carboxylic acid amides such as acetamide,
dimethylformamide,
propionamide,
dimethylpropionamide,
valeramide,
ethylvaleramide,
benzamide;
benzoguanamine,
urea;

preferred use is made of complexes of boron trifluoride with amines for example primary, secondary or tertiary amines such as methylamine,
dimethylamine,
trimethylamine,
monoethylamine,
diethylamine,
triethylamine,
tripropylamine,
n-butylamine,
amylamine,
decylamine,
2-ethylhexylamine,
laurylamine,
stearylamine,
allylamine,
monoethanolamine,
diethanolamine,
triethanolamine,
monoisopropanolamine,
diisopropanolamine,
triisopropanolamine,
hexanolamine,
ethylenediamine,
diethylenetriamine,
triethylenetetramine,
tetraethylenepentamine,
aminoethylethanolamine;

cycloalkylamines such as cyclohexylamine, dicyclohexylamine;

araliphatic amines such as benzylamine,
dimethylbenzylamine;
tris(dimethylaminomethyl)-phenol;

aromatic amines such as aniline,
methylaniline,
dimethylaniline,
ethylaniline,
butylaniline,
phenylhydrazine,
benzylaniline,
ortho-, meta- and para-phenylenediamine,
ortho-, meta- and para-toluidine,
diphenylamine,
triphenylamine,
benzidine,
bis(para-aminophenyl)methane,
bis(para-aminophenyl)sulfone;

Schiff's bases from aromatic amines, such as aniline, and aldehydes such as benzaldehyde; heterocyclic amines such as hexamethylenetetramine,
piperidine,
morpholine,
pyridine, pyridine homologues such as α-picoline, β-picoline and γ-picoline, lutidines such as 2,6-lutidine,
collidines,
2-ethanolpyridine,
4-ethanolpyridine,
2-hexylpyridine,
2-propanolpyridine,
4-propanolpyridine,
2-vinylpyridine,
quinoline,
isoquinoline,
quinaldine,
lepidine, aminopyridines such as 2-aminopyridine,
2-amino-4-methylpyridine or
2-amino-3-methylpyridine.

It may be of further advantage to use instead of a unitary boron trifluoride complex a mixture of the complexes mentioned above or a mixed complex of boron trifluoride with two or more of the afore-mentioned substances capable of forming complexes.

Particularly good results are obtained, for example, by using a combination of boron trifluoride-amine complexes, such as boron trifluoride-monoethylamine complex, with complexes from boron trifluoride and cyclic ethers, such as $BF_3$-bis(tetrahydrofurfuryl)phthalate complex.

The boron trifluoride complex is advantageously used in an amount of 0.1 to 20%, preferably 1 to 15%, by weight, referred to the amount of cycloaliphatic polyepoxy compound used.

The invention further provides a process for curing cycloaliphatic polyepoxy compounds containing at least one 1,2-epoxide group attached to a five-membered or six-membered ring, preferably at room temperature, wherein there is used as curing agent a metal fluoborate together with a complex of boron trifluoride and water or ammonia or an organic compound capable of forming complexes with boron trifluoride, preferably a boron trifluoride-amine complex.

The term "curing" as used in this context describes the polymerization of the polyepoxy compound to yield insoluble and infusible resins having good mechanical properties. In certain cases curing may consist in simply mixing the epoxy compound with the curing system at room temperature or a moderately higher temperature. In certain cases curing may alternatively be performed at an elevated temperature, for example ranging from 50° to 160° C.

According to the curing process of the invention there is first prepared a curable two-component system, the component (1) consisting of the cycloaliphatic polyepoxy compound, whereas component (2) is a stable, storable mixture of a metal fluoborate with the boron trifluoride complex. Such a two-component system may be marketed as a commercial product of practically unlimited storability at the ordinary room temperature, which may be converted by the consumer into the ready casting resin, laminating resin, coating medium, adhesive or plastic foam by simply mixing or melting the two components together.

The curable mixtures of the cycloaliphatic polyepoxy compound, the curing agent and the accelerator, or the curable two-component systems may be admixed at any phase prior to curing with an active diluent, filler, plasticiser, pigment, dyestuff, flame-inhibitor or mould lubricant.

As active diluents there may be used, for example, low-viscose monoepoxides such as butylglycide, butanediol diglycidyl ethers, 4-oxatetracyclo(6.2.1$^{2,7}$0$^{3,5}$)hendecan-9-ol or 4-(3',4'-epoxycyclohexyl)-3,5-dioxacyclohexanol.

Suitable extenders and fillers are, for example, rutil, mica, quartz powder, rock meal, alumina trihydrate, calcium carbonate, ground dolomite, gypsum or barium sulfate.

To improve the mechanical properties there may be further incorporated fibers or fabrics of glass, polyesters, nylon, polyacrylonitrile, silk or cotton.

For the manufacture of foamed plastics there may be further added the usual propellants, for example compounds that give off carbon dioxide or nitrogen under the curing conditions, and/or low-boiling inert organic liquids, such as trichlorofluoromethane.

The curable mixtures of this invention may be used without or with fillers, if desired in the form of solutions or emulsions, as laminating resins, paints, lacquers, dipping resins, casting resins, coating compositions, pore fillers, putties, adhesives, moulding compositions, plastic foams, insulating compounds for the electrical industry and for the manufacture of such products.

Percentages in the following examples are by weight.

Example 1

In experiments 1 to 3 100 g. each of 3-(3',4'-epoxy-cyclohexy)9,10 - epoxy - 2,4 - dioxaspiro(5.5)undecane (epoxy resin A), containing 6.3 epoxide equivalents per kg., are mixed with 7, 10 and 15 g. of aqueous zinc fluoborate solution (800 g./liter);

In experiment 4 100 g. of epoxy resin A are mixed with 10 g. of boron trifluoride-monoethylamine complex (marketed under the trademark "BF$_3$–400");

In experiments 5 and 6 100 g. of epoxy resin A are mixed with 10 g. and 50 g. respectively of boron trifluoride - bis(tetrahydrofurfuryl)phthalate complex (prepared from 1 g. of boron trifluoride dihydrate and 49 g. of bis(tetrahydrofurfuryl)phthalate);

In experiments 7 and 8 100 g. each of epoxy resin A are mixed with 10 g. of BF$_3$-monoethyl-amine complex, and with 5 and 10 g. respectively of BF$_3$-bis(tetrahydrofurfuryl)phthalate complex;

In experiments 9 to 12 100 g. each of epoxy resin A are mixed with 10 g. each of aqueous zinc fluoborate solution (800 g./liter) and 10, 5, 2 and 0.5 g. respectively of BF$_3$-bis(tetrahydrofurfuryl)phthalate complex;

In experiments 13 to 17 100 g. each of epoxy resin A are mixed with the amounts shown in the following Table of aqueous zinc fluoborate solution, BF$_3$-monoethyl-amine complex and boron fluoride-bis(tetrahydrofurfuryl)phthalate complex.

All mixtures being prepared at room temperature. The mixture is then poured in each case into aluminum tubes (140 x 40 x 10 mm.) and cured for 14 hours at room temperature.

The following Table 1 lists the mechanical properties and the heat distortion points of the resulting castings.

The heat distortion points according to Martens (DIN) of the specimens of this invention are substantially superior to those of comparative specimens, provided the latter can be cured at all or are at all applicable owing to their excessive reactivity.

TABLE 1

| Experiment | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Epoxy resin A | 100 | 100 | 100 | 100 | 100 | 100 | 100 | 100 | 100 | 100 | 100 | 100 | 100 | 100 | 100 | 100 | 100 |
| Zinc fluoborate [1] | 7 | 10 | 15 | | | | | | 10 | 10 | 10 | 10 | 5 | 6 | 8.5 | 5.7 | 5 |
| BF$_3$-monoethylamine complex | | | | 10 | | | 10 | 10 | | | | | 5 | 6 | 1.75 | 1.15 | 1 |
| BF$_3$-bis(tetrahydrofurfuryl)phthalate complex [2] | | | | | 10 | 50 | 5 | 10 | 10 | 5 | 2 | 0.5 | 5 | 3 | 1.75 | 1.15 | 0 |
| Heat distortion point accdg. to Martens (DIN) °C | 106 | 131 | | | | | | | | | | | 146 | 147 | 135 | 159 | 149 |
| Flexural strength, kg./mm.$^2$ | 5 | 3 | | | | | | | | | | | 4 | 5 | 4 | 5 | 4 |
| Impact strength, cmkg./cm.$^2$ | 2 | 1 | | | | | | | | | | | 1 | 2 | 2 | 2 | 2 |
| Remarks | | | (3) | (4) | (5) | (6) | (6) | (6) | (7) | (7) | (7) | (7) | | | | | |

[1] Aqueous solution containing 800 g./liter.
[2] Prepared from 1 part of boron fluoride (BF$_3$.2H$_2$O) and 49 parts of bis(tetrahydrofurfuryl)phthalate.
[3] Casting brittle.
[4] No curing occurs.
[5] Mixture too reactive, gells on mixing.
[6] Casting brittle, not completely cured.
[7] Mixture too reactive, casting decomposes.

Example 2

In experiment 1 100 g. of 6-methyl-3,4-epoxycyclo-hexylcarboxylic acid - (6-methyl - 3,4 - epoxycyclohexyl) methyl ester, marketed under the trade name "Unox 201" (epoxy resin B), containing 6.56 epoxide equivalents per kg., are mixed with 11 g. of maleic anhydride and a solution of 0.7 g. of BF$_3$-monoethylamine complex in 7 g. of ethyleneglycol.

In experiment 2 100 g. of epoxy resin B are mixed with 10 g. of an aqueous zinc fluoborate solution (800 g./liter).

And in experiment 3 100 g. of epoxy resin B are mixed with a solution of 2 g. of BF$_3$-monoethylamine complex in 10 g. of an aqueous zinc fluoborate solution (800 g./liter) all mixtures being prepared at room temperature and then cured for 14 hours at room temperature.

The following Table 2 lists the mechanical properties and the heat distortion points of the resulting castings.

Compared with experiments 1 and 2 the mixture used in experiment 3 displays a better heat distortion behaviour. Another striking feature is the lighter color of the castings by virtue of the better controllability of the exothermic curing reaction. Whereas the mixture of maleic anhydride with the BF$_3$-amine complex is not storable, the mixture of the BF$_3$-amine complex with the zinc fluoborate solution displays a good shelf-life. The curable system of experiment 1 must therefore be marketed as a three-component system, whereas the curable system of experiment 3 can be marketed as a two-component system.

TABLE 2

| Experiment | 1 | 2 | 3 |
|---|---|---|---|
| Epoxy resin B | 100 | 100 | 100 |
| Maleic anhydride | 11 | | |
| Ethyleneglycol | 7 | | |
| $BF_3$-monoethylamine complex | 0.7 | | 2 |
| Aqueous zinc fluoborate solution (800 g./liter) | | 10 | 10 |
| Heat distortion point accdg. to Martens (DIN) °C | 105 | 58 | 119 |
| Flexural strength, kg./mm.$^2$ | 8 | 4.5 | 9.5 |
| Impact strength cmkg./cm.$^2$ | 3.5 | 1.0 | 4.5 |
| Casting is | (1) | (2) | (2) |

[1] Blackish (exothermic reaction).
[2] Light brown.

Example 3

In experiments 1 and 2 80 g. and 70 g. respectively of epoxy resin A (cf. Example 1) and 20 g. and 30 g. respectively of (4-oxatetracyclo)-6.2.1.0$^{2,7}$.0$^{3,5}$(hendec - 9-yl) - glycidyl - ether (epoxy resin C), containing 6.8 epoxide equivalents per kg.;

In experiments 3 and 4 80 g. each of epoxy resin A and 20 g. of 3-vinyl-9,10 - epoxy - 2,4-dioxaspiro(5,5)-undecane (active diluent D) containing 4.8 epoxide equivalents per kg.;

In experiments 5 and 6 100 g. of epoxy resin A and 20 g. of butanediol diglycidyl ether (active diluent E), containing 7.8 epoxide equivalents per kg. were mixed with the amounts shown in the following Table 3 of aqueous zinc fluoborate solution (800 g./liter), $BF_3$-monoethylamine complex and boron fluoride-bis(tetrahydrofurfuryl)-phthalate complex [prepared from 1 part of boron fluoride dihydrate and 49 parts of bis(tetrahydrofurfuryl)-phthalate], at room temperature and then cured as described in Example 2.

The following Table 3 lists the properties of the curable mixtures as well as the mechanical properties and heat distortion points of the cured castings.

Example 4

In experiments 1 to 3 100 g. each of epoxy resin A (cf. Example 1);

In experiment 4 80 g. of epoxy resin A and 20 g. of active diluent C (cf. Example 3); and In experiments 5 and 6 80 g. each of epoxy resin A and 20 g. of active diluent D (cf. Example 3) were mixed with the amounts, shown in the following Table 4, of copper fluoborate solution (45% aqueous solution) and $BF_3$-monoethylamine complex at room temperature, poured into aluminum tubes (140 x 40 x 10 mm.) and cured at room temperature as described in Example 2.

The following Table 4 lists the heat distortion points of the resulting castings. As will be seen, these casting resins of the invention display heat distortion points according to Martens (DIN) that are extremely high for articles cured at room temperature.

TABLE 4

| Experiment | 1 | 2 | 3 | 4 | 5 | 6 |
|---|---|---|---|---|---|---|
| Epoxy resin A, g | 100 | 100 | 100 | 80 | 80 | 80 |
| Active diluent C, g | | | | 20 | | |
| Active diluent D, g | | | | | 20 | 20 |
| Copper fluoborate, 45% aqueous solution, g | 2 | 1.8 | 1.4 | 1.4 | 1.8 | 1.4 |
| $BF_3$-monoethylamine complex, g | 5 | 4.2 | 5.6 | 5.6 | 4.2 | 5.6 |
| Heat distortion point accdg. to Martens (DIN), °C | 154 | 163 | 180 | 149 | 127 | 133 |

Example 5

In experiments 1 to 3 100 g. each of epoxy resin A (cf. Example 1) were mixed with 2 g. each of boron trifluoride-monoethylamine complex [marketed under the tradename $BF_3$–400] and with 2 g. each of boron trifluoride-bis(tetrahydrofurfuryl)phthalate complex [prepared from 1 g. of boron trifluoride dihydrate and 49 g. of bis-(tetrahydrofurfuryl)phthalate] and with 12 g. of 10% cadmium fluoborate solution in tetrahydrofurfuryl alcohol, 10 g. of 25% strontium fluoborate solution in tetrahydrofurfuryl alcohol or 10 g. of 40% barium fluoborate solution in tetrahydrofurfuryl alcohol, then poured into aluminum tubes (140 x 40 x 10 mm.) and cured for 14 hours at room temperature.

The following Table 5 lists the mechanical properties and heat distortion points of the cured castings.

TABLE 3

| Experiment | 1 | 2 | 3 | 4 | 5 | 6 |
|---|---|---|---|---|---|---|
| Epoxy resin A | 80 | 70 | 80 | 80 | 100 | 100 |
| Epoxy resin C | 20 | 30 | | | | |
| Active diluent D | | | 20 | 20 | | |
| Active diluent E | | | | | 20 | 20 |
| Zinc fluoborate solution (800 g./liter of water) | 5.7 | 5.7 | 8.5 | 5.7 | 6 | 5.7 |
| $BF_3$-monoethylamine complex | 1.15 | 1.15 | 1.75 | 1.15 | 6 | 1.15 |
| $BF_3$-bis(tetrahydrofurfuryl)phthalate complex [1] | 1.15 | 1.15 | 1.75 | 1.15 | 3 | 1.15 |
| Viscosity of resin curing agent mixture at 25° C., in centipoises | 7500 | 4000 | 4000 | 5000 | 850 | 1300 |
| Shelf-life at 25° C. (viscosity rising to 10.000 centipoises), in minutes | 10 | 30 | 25 | 20 | 60 | 50 |
| Heat distortion point accdg. to Martens (DIN), °C | 138 | 140 | 103 | 112 | 94 | 102 |
| Flexural strength, in kg./mm.$^2$ | 4 | 5 | 5 | 4 | 11 | 7 |
| Impact strength, in cmkg./cm.$^2$ | 2 | 1 | 2 | 1.5 | 4 | 4 |

[1] Prepared from 1 part of $BF_3 \cdot 2H_2O$ and 49 parts of bis(tetrahydrofurfuryl)phthalate.

TABLE 5

| Experiment | 1 | 2 | 3 |
|---|---|---|---|
| Epoxy resin A | 100 | 100 | 100 |
| BF₃-monoethylamine complex | 2 | 2 | 2 |
| BF₃-bis(tetrahydrofurfuryl)phthalate complex | 2 | 2 | 2 |
| Cadium fluoborate solution 10% in tetrahydrofurfuryl alcohol | 12 | | |
| Strontium fluoborate solution 25% in tetrahydrofurfuryl alcohol | | 10 | |
| Barium fluoborate solution 40% in tetrahydrofurfuryl alcohol | | | 10 |
| Heat distortion point accdg. to Martens (DIN) in °C | 141 | 118 | 131 |
| Flexural strength in kg./sq. mm | | 3.1 | 3.6 |
| Impact strength, in cmkg./sq. cm | | 0.7 | 0.7 |

Example 6

In experiment 1 100 g. of epoxy resin A were mixed with 10 g. of a solution of nickel fluoborate in tetrahydrofurfuryl alcohol (containing 190 g. of nickel fluoborate per liter) and 0.1 g. of boron trifluoride dihydrate.

In experiments 2 and 3 100 g. each of epoxy resin A were mixed with 10 g. each of aqueous zinc fluoborate solution (800 g./liter) and 0.1 g. and 0.2 g. respectively of boron trifluoride-ethyletherate, then poured into aluminum tubes (140 x 40 x 10 mm.) and cured at room temperature for 14 hours.

The following Table 6 lists the mechanical properties and heat distortion points of the cured castings.

TABLE 6

| Experiment | 1 | 2 | 3 |
|---|---|---|---|
| Epoxy resin A | 100 | 100 | 100 |
| Nickel fluoborate in tetrahydrofurfuryl alcohol (190 g./liter) | 10 | | |
| Zinc fluoborate in water (800 g./liter) | | 10 | 10 |
| Boron trifluoride dihydrate | 0.1 | | |
| Boron trifluoride ethyletherate | | 0.1 | 0.2 |
| Heat distortion point accdg. to Martens (DIN), °C | 85 | 105 | 82 |
| Flexural strength, kg./mm.² | 2.1 | 1.7 | 1.0 |
| Impact strength, cmkg./cm.² | 0.5 | 0.6 | 0.3 |

What is claimed is:

1. A cold-curable composition of matter comprising
   (a) a cycloaliphatic polyepoxy compound containing at least one 1,2-epoxide group attached to a carbocyclic ring with at least 5 and at the most 6 members,
   (b) a metal fluoborate, wherein the metal is of the group consisting of lithium, iron, cobalt, nickel, chromium, manganese, cadmium, mercury, beryllium, magnesium, calcium, strontium, barium, aluminum, vanadium, antimony, tantalum, lanthanum, tin, lead, copper and zinc, and
   (c) a complex of boron trifluoride with a member selected from the group consisting of water, ammonia and organic compounds capable of forming a complex with boron trifluoride.

2. A curable mixture as claimed in claim 1, containing as boron trifluoride complex (c) a boron trifluoride-amine complex.

3. A curable mixture as claimed in claim 2, containing as boron trifluoride complex (c) the boron trifluoride-monoethylamine complex.

4. A curable mixture as claimed in claim 1, containing as component (c) a mixture of a boron trifluoride-amine complex and a complex of boron trifluoride with a cyclic ether.

5. A curable mixture as claimed in claim 4, containing as component (c) a mixture of the boron trifluoride-monoethylamine complex and the boron trifluoride-bis-(tetrahydrofurfuryl)phthalate complex.

6. A curable mixture as claimed in claim 1, containing the boron trifluoride complex (c) in an amount of 0.1 to 20% by weight, referred to the weight of the cycloaliphatic polyepoxy compound (a).

7. A curable mixture as claimed in claim 1, containing as metal fluoborate (b) a member selected from the group consisting of zinc fluoborate, nickel fluoborate, copper fluoborate, cadmium fluoborate, strontium fluoborate and barium fluoborate.

8. A curable mixture as claimed in claim 1, containing the metal fluoborate (b) in the form of the hydrate.

9. A curable mixture as claimed in claim 1, containing the metal fluoborate (b) in the form of a concentrated aqueous solution.

10. A curable mixture as claimed in claim 1, containing the metal fluoborate (b) in an amount of 0.1 to 20% referred to the weight of the cycloaliphatic polyepoxy compound (a).

References Cited
UNITED STATES PATENTS 3,004,952 10/1961 Brueschweiler et al. ___ 260—47
3,112,294 11/1963 Newey.

WILLIAM H. SHORT, *Primary Examiner.*

T. PERTILLA, *Assistant Examiner.*